US008753127B2

(12) United States Patent
Krebs

(10) Patent No.: US 8,753,127 B2
(45) Date of Patent: Jun. 17, 2014

(54) DATA OBJECT PREVIEWER

(75) Inventor: Andreas S. Krebs, Karlsruhe (DE)

(73) Assignee: SAP AG, Walldorf (DE)

( * ) Notice: Subject to any disclaimer, the term of this patent is extended or adjusted under 35 U.S.C. 154(b) by 2608 days.

(21) Appl. No.: 10/831,398

(22) Filed: Apr. 23, 2004

(65) Prior Publication Data

US 2005/0251784 A1    Nov. 10, 2005

(51) Int. Cl.
*G09B 23/28* (2006.01)

(52) U.S. Cl.
USPC ............ 434/323; 434/322; 434/350; 434/362

(58) Field of Classification Search
USPC .......................... 434/118, 322, 323, 350, 362
See application file for complete search history.

(56) References Cited

U.S. PATENT DOCUMENTS

| | | | | |
|---|---|---|---|---|
| 5,597,312 A * | 1/1997 | Bloom et al. | ................. | 434/362 |
| 5,730,604 A * | 3/1998 | Jay et al. | ....................... | 434/365 |
| 5,823,789 A * | 10/1998 | Jay et al. | ....................... | 434/365 |
| 5,890,911 A * | 4/1999 | Griswold et al. | ............. | 434/322 |
| 6,014,134 A * | 1/2000 | Bell et al. | ..................... | 715/705 |
| 6,288,753 B1 * | 9/2001 | DeNicola et al. | ............ | 348/586 |
| 6,315,572 B1 * | 11/2001 | Owens et al. | ................ | 434/322 |
| 6,793,498 B1 * | 9/2004 | Nunes | .............................. | 434/322 |
| 6,827,578 B2 * | 12/2004 | Krebs et al. | ................... | 434/118 |
| 6,975,833 B2 * | 12/2005 | Theilmann et al. | ........... | 434/350 |
| 7,029,280 B2 * | 4/2006 | Krebs et al. | ................... | 434/118 |
| 7,413,442 B2 * | 8/2008 | Okunishi et al. | ............. | 434/323 |
| 7,428,518 B1 * | 9/2008 | Zorba et al. | ..................... | 706/47 |
| 7,433,646 B2 * | 10/2008 | Fujino et al. | ................... | 434/350 |
| 7,433,852 B1 * | 10/2008 | Bertrand et al. | ................ | 706/45 |
| 2002/0142278 A1 * | 10/2002 | Whitehurst et al. | .......... | 434/350 |
| 2002/0188583 A1 * | 12/2002 | Rukavina et al. | .............. | 706/45 |
| 2003/0152905 A1 * | 8/2003 | Altenhofen et al. | .......... | 434/362 |
| 2005/0026131 A1 * | 2/2005 | Elzinga et al. | ................ | 434/365 |

FOREIGN PATENT DOCUMENTS

GB     2338333 A    * 12/1999

OTHER PUBLICATIONS

Advanced Distributed Learning. ADL SCORM Version 1.3 Application Profile, Working Draft 0.9 [Nov. 27, 2002].*

* cited by examiner

*Primary Examiner* — Nikolai A Gishnock
(74) *Attorney, Agent, or Firm* — Kenyon & Kenyon LLP

(57) ABSTRACT

A method and apparatus for a data object previewer is described. In an embodiment, the invention is a method. The method includes detecting a change in a structure. The method also includes processing the structure into a preview. The method further includes presenting the preview.

In another embodiment, the invention is a system. The system includes a processor, a bus coupled to the processor, and a memory coupled to the bus. The processor is to detect a change in a structure, process the structure into a preview, and present the preview.

25 Claims, 19 Drawing Sheets

DATA OBJECT PREVIEWER

FIELD

The present document relates to the field of software creation, and more particularly to creation of data objects.

BACKGROUND

Programming computers is a labor-intensive process, requiring talented workers, computer power for programming and time for an iterative process of writing, review/debugging, and editing. Computer programs are written for a variety of purposes, often using similar algorithms and modules for varied and diverse applications. Moreover, different programs can utilize similar user interfaces for example, allowing for user familiarity and potential reuse. However, slight changes to programs or content or structures can have ripple effects which are hard to track or predict, and thus may lead to undesirable results. Additionally, individual programs often require customization at a level such that general aspects of an algorithm may be reused while specific details vary from implementation to implementation.

One form of high level programming relates to scripting learning environments. While this may not involve writing code in a native or near-native programming language (such as C or C++ or Java for example), it often involves manipulation of higher level abstract objects which make up a user interface, for example. Such manipulation may result in an abstract and complicated structure, which does not lend itself to straightforward visualization or which a user (programmer) can easily maintain mentally. Accordingly, it may be useful to provide a method of previewing a proposed structure.

Moreover, the structure may be influenced by not only the various objects incorporated, but also by how those objects are used. Use of the objects may be governed by pre-programmed strategies for use, such that application of different pre-programmed strategies may result in significant changes to otherwise relatively static structures. As such, it may be useful to provide a method of previewing the proposed structure according to different strategies for use.

With multiple learning structures in existence, it may be useful to reuse these structures to perform the same functions (convey the same content) without requiring reprogramming (or duplication of content). Moreover, it may be useful to reuse parts of existing structures without requiring use or execution of the entire structure. As a result, objects may be reused within these structures (or from one structure to another), thus further complicating the structures in question.

SUMMARY

The present invention is described and illustrated in conjunction with systems, apparatuses and methods of varying scope. In addition to the aspects of the present invention described in this summary, further aspects of the invention will become apparent by reference to the drawings and by reading the detailed description that follows. A method and apparatus for a data object previewer is described.

In one embodiment, the invention is a method. The method includes detecting a change in a structure. The method also includes processing the structure into a preview. Processing the structure includes creating an initial state model for an object of the structure in relation to a strategy of the structure. Process the structure also includes requesting a next available option for the object in relation to the strategy. Moreover, processing the structure includes updating the state model for the object. Also, processing the structure includes determining no options are available for the object in relation to the strategy. Processing the structure further includes determining that something within the object was not reached based on the state model. Processing the structure also includes providing an indication of an error responsive to the determining that something was not reached. The method further includes presenting the preview.

In an alternate embodiment, the invention is a method. The method includes detecting a change in a structure. The method also includes processing the structure into a preview. The method further includes presenting the preview.

In another alternate embodiment, the invention is a system. The system includes a processor, a bus coupled to the processor, and a memory coupled to the bus. The processor is to detect a change in a structure, process the structure into a preview, and present the preview.

In still another alternate embodiment, the invention is an apparatus. The apparatus includes means for detecting a change in a structure. The apparatus also includes means for processing the structure into a preview. The apparatus further includes means for presenting the preview.

In a further embodiment, the invention is a medium embodying instructions. The instructions, when executed by a processor, cause the processor to perform a method. The method includes detecting a change in a structure. The method further includes processing the structure into a preview. The method also includes presenting the preview.

The present invention is exemplified in the various embodiments described, and is limited in spirit and scope only by the appended claims.

BRIEF DESCRIPTION OF THE DRAWINGS

The present invention is illustrated in various exemplary embodiments and is limited in spirit and scope only by the appended claims.

Like reference symbols in the various drawings indicate like elements or the same element.

DETAILED DESCRIPTION

Figure 1:
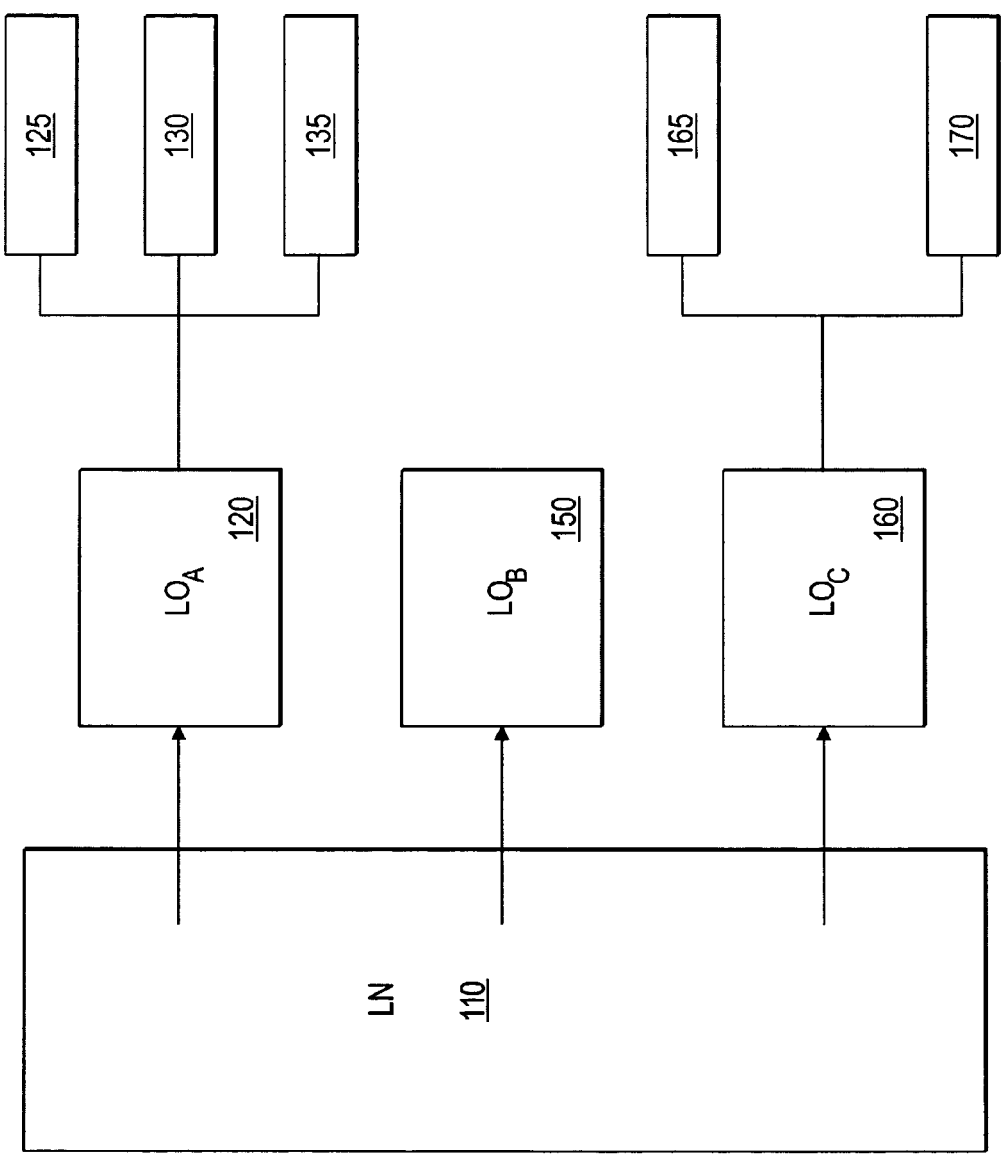
FIG. 1 illustrates an embodiment of a learning net and associated learning objects.

The present invention is described and illustrated in conjunction with systems, apparatuses and methods of varying scope. In addition to the aspects of the present invention described in this summary, further aspects of the invention will become apparent by reference to the drawings and by reading the detailed description that follows.

In one embodiment, the data object previewer allows for a preview of learning nets, learning objects and strategies, detecting changes, updating a simplified preview of the overall structure, and then presenting that preview to the user in a simplified form. Thus, the previewer may allow the user to explore the structure created and manipulate the structure with near-immediate feedback. Moreover, such a previewer may be adapted to other structures, including other forms of data objects or structures, consistent with the overall approach of evaluating a structure and presenting the structure in a simple form.

Learning nets may be formed of a set of learning objects and other learning nets, preferably providing a self-contained instructional unit (a lesson for example). Since learning and instructional structures may be flexible and may be structured in many different ways, learning nets may thus take on a variety of structures, depending on such aspects as levels of detail, instructional approaches, and data available for example. Strategies may be used in conjunction with learning nets to determine how (what order) and whether portions of the learning net are presented.

Learning objects may be formed of a set of atomic learning materials, such as data in one or more forms of media (such as audio, visual, textual, or other forms for example). The atomic learning materials may be structured in a variety of ways within the learning object, with relationships such as prerequisites or alternatives for example. Moreover, the learning object may be presented according to a strategy, wherein the strategy may dictate how or whether the various atomic learning materials are presented.

Strategies may take on various forms, and typically are designed to facilitate a type of learning or a type of usage of objects. In some embodiments, strategies are a set of rules which operate on a structure (such as a learning object or net for example), to create a presentation order for the material (such as atomic learning materials or objects for example) in the structure. For example, a strategy may be inductive or deductive, thus affecting the order of presentation of learning materials and learning objects. Alternatively, a strategy may be orientation-only or orientation-first, for example, and thus may cause only orientation-type materials to be presented, or may cause orientation-type materials to be presented first. Other examples may include strategies related to example-first, information-first, explanation-first, example-only, explanation-only and information-only strategies, for example.

In some embodiments, strategies may be divided into macro strategies and micro strategies. Macro strategies relate to learning nets. Micro strategies relate to learning objects. In other embodiments, such divisions may not be necessary.

In one embodiment, the invention is a method. The method includes detecting a change in a structure. The method also includes processing the structure into a preview. Processing the structure includes creating an initial state model for an object of the structure in relation to a strategy of the structure. Process the structure also includes requesting a next available option for the object in relation to the strategy. Moreover, processing the structure includes updating the state model for the object. Also, processing the structure includes determining no options are available for the object in relation to the strategy. Processing the structure further includes determining that something within the object was not reached based on the state model. Processing the structure also includes providing an indication of an error responsive to the determining that something was not reached. The method further includes presenting the preview.

In an alternate embodiment, the invention is a method. The method includes detecting a change in a structure. The method also includes processing the structure into a preview. The method further includes presenting the preview.

In another alternate embodiment, the invention is a system. The system includes a processor, a bus coupled to the processor, and a memory coupled to the bus. The processor is to detect a change in a structure, process the structure into a preview, and present the preview.

In still another alternate embodiment, the invention is an apparatus. The apparatus includes means for detecting a change in a structure. The apparatus also includes means for processing the structure into a preview. The apparatus further includes means for presenting the preview.

In a further embodiment, the invention is a medium embodying instructions. The instructions, when executed by a processor, cause the processor to perform a method. The method includes detecting a change in a structure. The method further includes processing the structure into a preview. The method also includes presenting the preview.

A further illustration of a learning object and learning net may be useful. FIG. 1 illustrates an embodiment of a learning net and associated learning objects. Structure 100 includes a learning net and a variety of associated learning objects. Structure 100 is also influenced, and in some embodiments may include, strategies (not shown). Learning net 110 includes (or is linked to or associated with) three learning objects. A first learning object 120 is linked to learning net 110 and includes atomic learning materials 125, 130 and 135. Atomic learning materials 125, 130 and 135 may include video presentations on a topic, textual information about a topic, audio information about a topic, some multimedia combination of such information, or other instructional material. For example, a testing module may be implemented, thereby allowing for user feedback.

Also linked to learning net 110 are learning objects 150 and 160. As depicted, learning object 160 includes atomic learning materials 165 and 170. Again, learning materials 165 and 170 may take various forms, such as video, audio or text forms, for example. Moreover, while learning object 150 is not depicted as containing atomic learning materials, it may embody what may otherwise viewed as atomic learning materials, for example.

Figure 2:
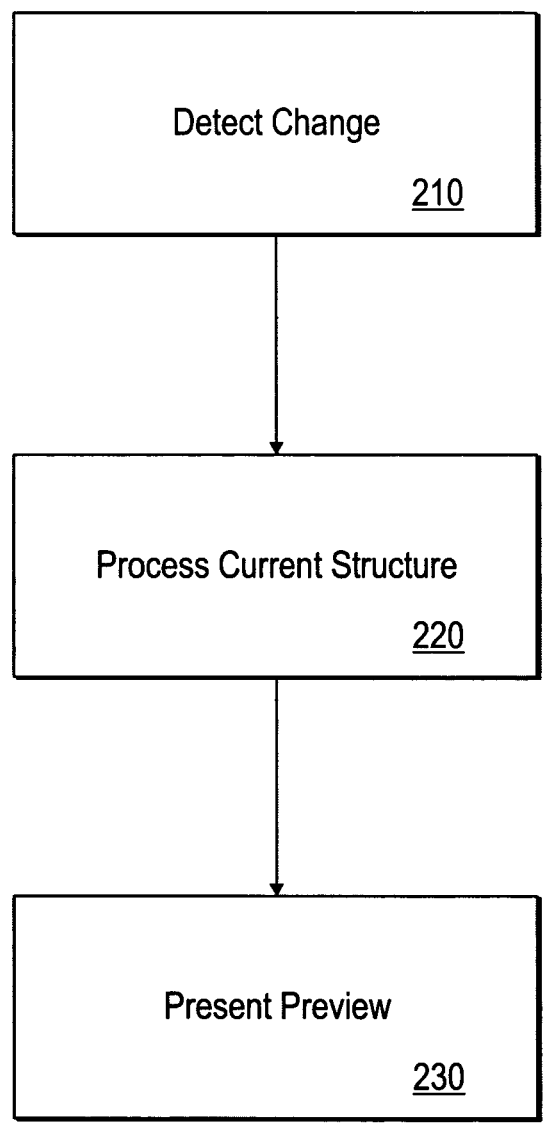
FIG. 2 illustrates an embodiment of a method of previewing a learning net and/or learning objects.

As a strategy, learning net or learning object is created or manipulated (customized for example), previewing the current status may be useful. FIG. 2 illustrates an embodiment of a method of previewing a learning net and/or learning objects. Method 200 includes detecting changes, processing a current structure, and presenting a preview. Method 200 is presented as a serial set of modules, which may be executed or implemented in a parallel or serial fashion as appropriate for various implementations. Other methods of this document are similarly composed of modules or components and may be similarly molded to specific details of various embodiments.

At module 210, a change is detected in the structure to be previewed. For example, the various strategies, learning objects and learning nets may be objects which are subscribed to by the previewer, such that notification of changes is sent to the previewer. Upon notification of such a change, at module 220, the current structure is reviewed or processed. Module 220 creates a model of the structure which may be navigated as part of a preview process and may be presented to the user in a visually perceptible manner. At module 230, the visually perceptible model is then presented to the user.

Figure 3:
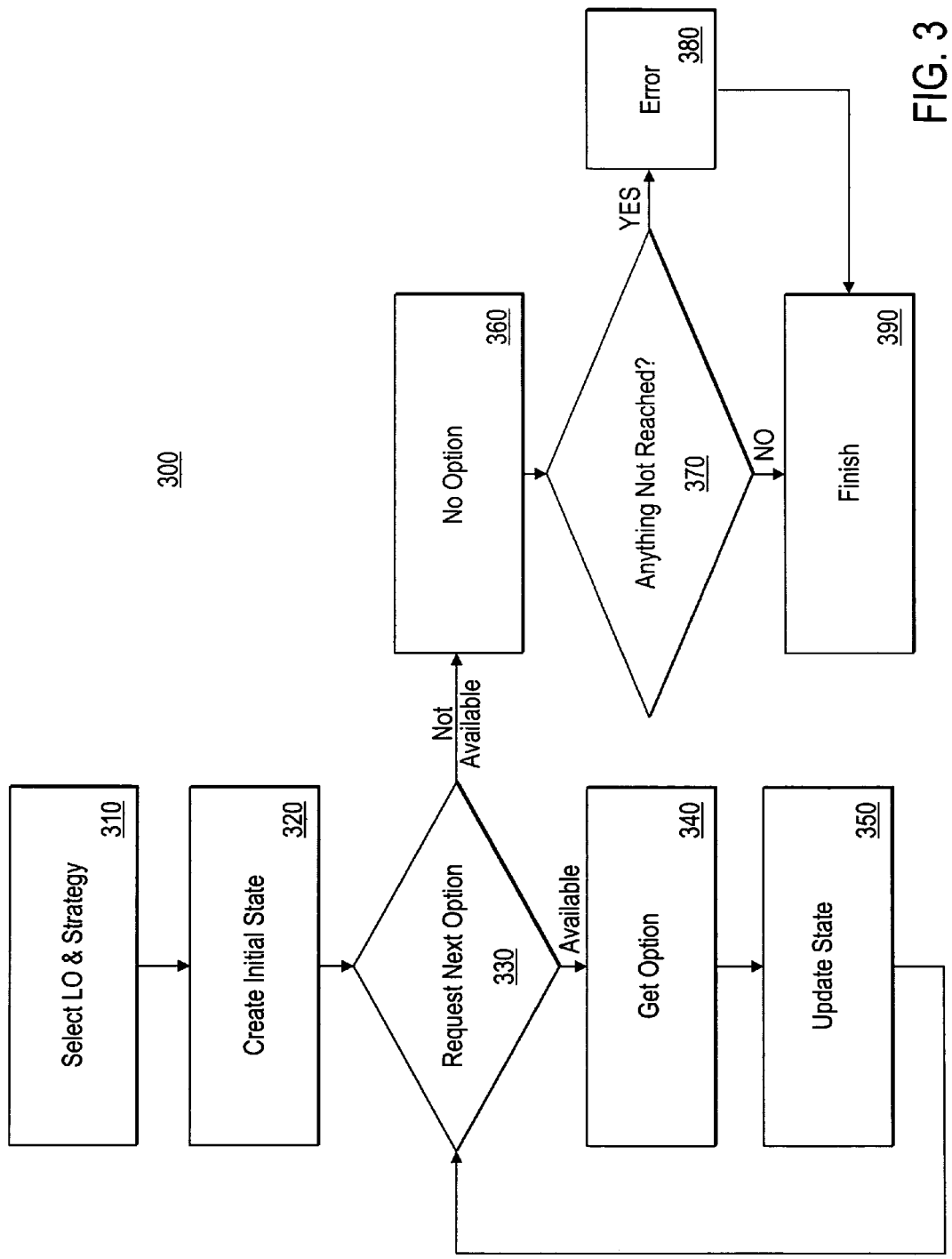
FIG. 3 illustrates an embodiment of a method of previewing a learning object.

In processing the various objects and nets, a model may be built for use in previewing. FIG. 3 illustrates an embodiment of a method of previewing a learning object. Method 300 includes selecting a learning object and strategy, creating a state model, cycling through options of the learning object, and determining if any options were not reached. Method 300, like method 200, is composed of a set of modules.

At module 310, the learning object and strategy is selected. A similar method may be used for a learning net, with the learning net selected at module 310. At module 320, an internal state model for the learning object is created, maintaining information about what part of a learning object is effectively being previewed in a simulation and what parts of the learning object have already been previewed (or reached). At module 330, a next option (or set of options) is requested from the strategy, with the strategy using the learning object as its input. Initially, this is the first option or set of options. Preferably, options (portions) of the learning object which have previously been visited are not included in available options, either through operation of the strategy or by checking the state model after the strategy provides (returns) the options.

At module 340, an option is selected from the requested option(s), and the associated atomic learning material is effectively accessed and marked as visited or reached. In some situations, multiple options may be available, and in such situations, various defaults may be used, such as selecting the first option, randomly selecting an option, choosing only from options not previously chosen, or other defaults may be used. At module 350, the state of the learning object within the preview is updated based on the option taken, and the process returns to module 330.

When no options are available, the process moves to module 360, where the state of the learning object is finalized. At module 370, the chosen options of the learning object are compared to the available options, to determine if all options were exercised or chosen (a determination is made as to whether all options are marked as visited, for example). If not, at module 380, an error message is generated indicating what was missed, for example. If all options were chosen, or if the error message(s) have all been created, the process finishes at module 390 for the learning object in question.

Figure 4:
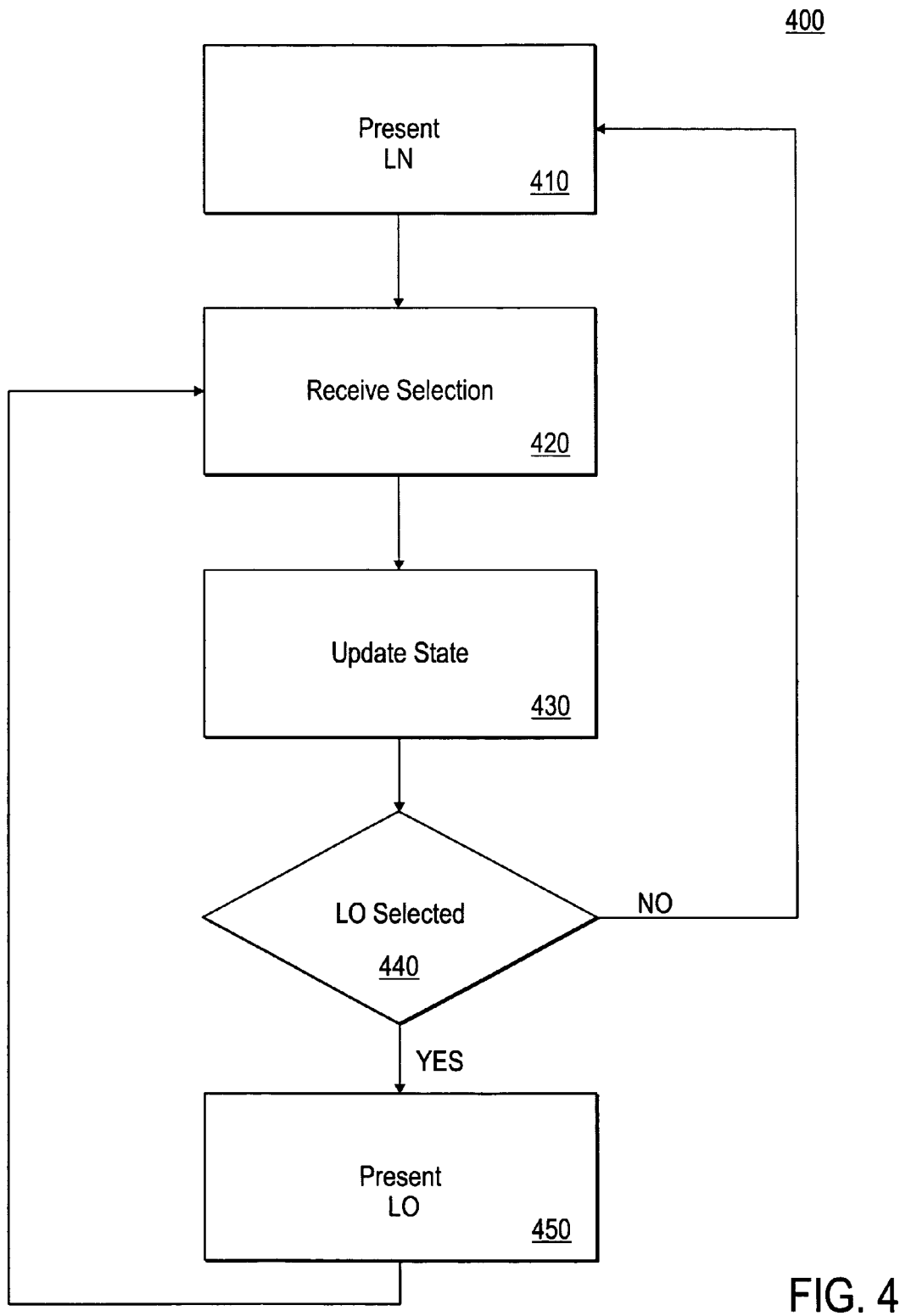
FIG. 4 illustrates an embodiment of a method of presenting a preview.

With the preview up-to-date, the preview is most useful if presented to a user for evaluation. FIG. 4 illustrates an embodiment of a method of presenting a preview. Method 400 includes presenting learning nets and learning objects, receiving selections from a user, and maintaining a state of the preview. At module 410, a learning net (or the learning net) is presented. At module 420, a selection of which option to take is received from a user. Alternatively, a selection of a different strategy may have the same effect at module 420, for example. Responsive to the selection, at module 430, the state of the preview is updated (such as where in the preview the user is).

At module 440, a determination is made as to whether a learning net or a learning object was selected (and whether the user has moved up or down in a hierarchy). If the selection is a learning object, then the learning object is presented at module 450 and the process returns to module 420. Likewise, if the selection is a learning net, the learning net is presented at module 410.

Figure 5:
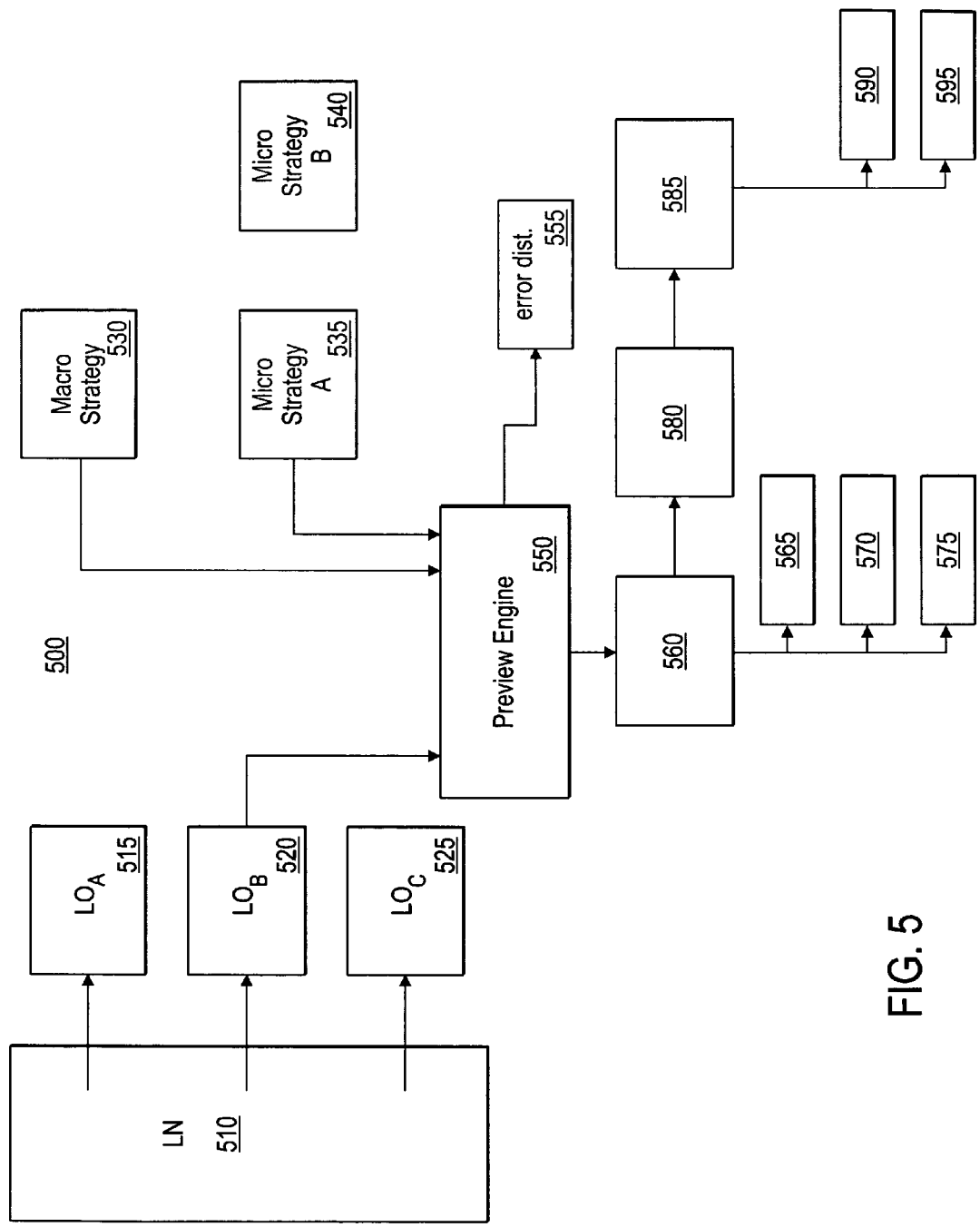
FIG. 5 illustrates an embodiment of relationships between a preview and various components.

The various pieces or components used in presenting a preview may be illustrated for a better understanding of the overall picture. FIG. 5 illustrates an embodiment of relationships between a preview and such components. System 500 includes the preview engine, strategies, learning objects and nets, and what is exported to a user interface.

Preview engine 550 previews a learning net (such as learning net 510 for example) and associated learning objects (such as objects 515, 520 and 525 for example) and other associated learning nets (not shown) in conjunction with a strategy or strategies (530, 535 and 540 for example). Preview engine 550 uses a macro strategy (such as strategy 530 for example) and may use one or more micro strategies (such as strategies 535 and 540 for example).

Preview engine 550 generates an error list 555 if necessary, and generates viewable representations of an order of the learning net(s) and learning objects. For example, viewable object 560 may correspond to learning object 515, with learning materials 565, 570 and 575 for example. Similarly, viewable object 580 may correspond to learning object 520 for example. Moreover, viewable object 585 may correspond to learning object 525, including learning materials 590 and 595. Viewable objects may be used in conjunction with a user interface to allow a user to visually (or otherwise) perceive the learning objects in a representative state.

Figure 6:
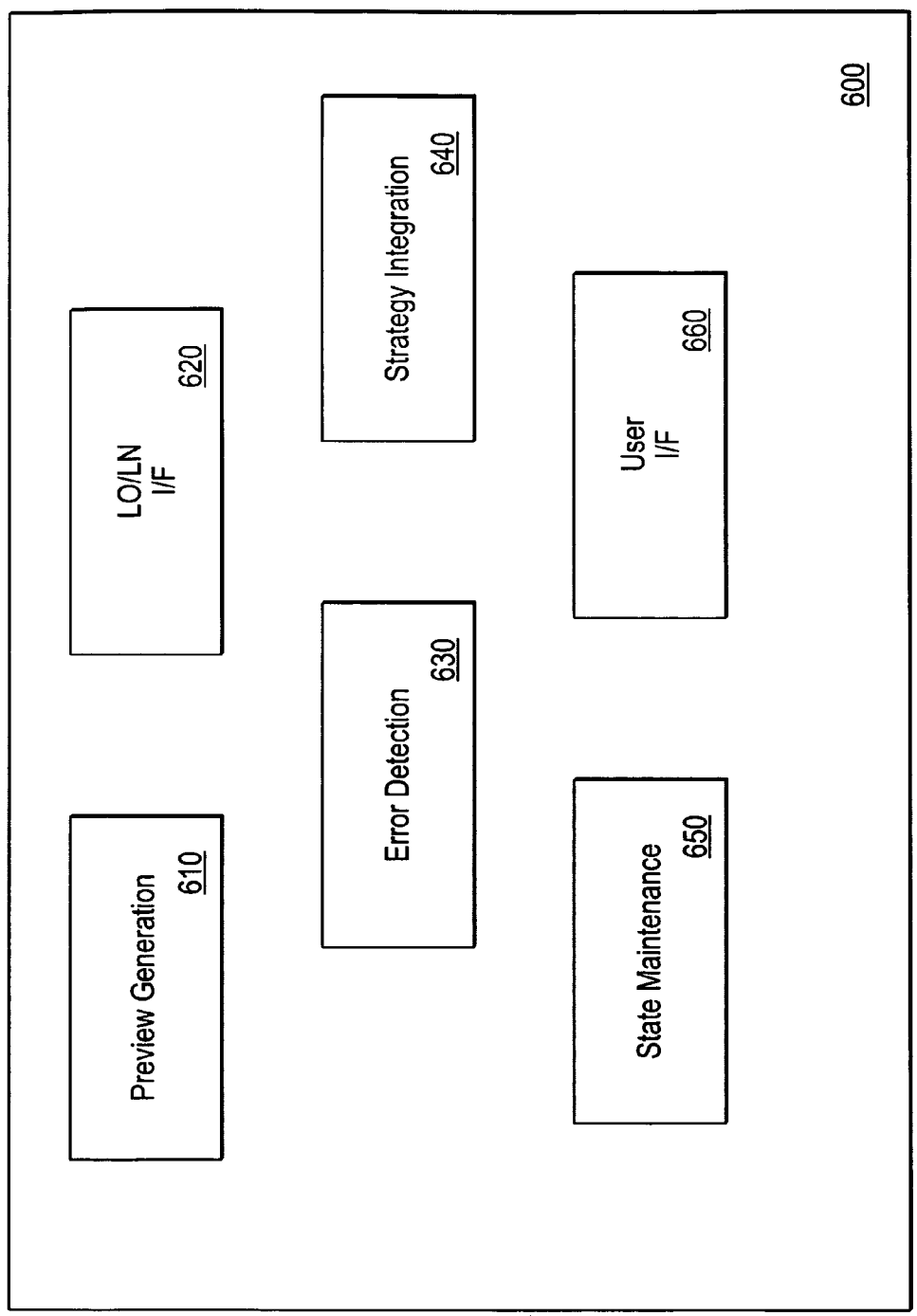
FIG. 6 illustrates an embodiment of a medium which may embody a previewer.

The previewer may be implemented as part of a medium or media. FIG. 6 illustrates an embodiment of a medium which may embody a previewer. Various forms of media which may be used are described with respect to FIGS. 7 and 8 below, and such media may be used either singly or in combination. The medium may be expected to embody instructions which, when executed by a processor, cause the processor to perform a method. Thus, the medium may include a variety of modules.

Medium 600 embodies a previewer, including modules for generating a preview, interfacing with other modules, maintaining state of a preview, and checking for errors. Preview generation module 610 generates the preview. Learning object and net interface module 620 allows for interfacing with the various learning objects and learning nets, such as setting up reporting relationships and requests for next options, for example. Strategy integration module 640 similarly allows for interface with a strategy. Strategies may determine how options are explored within a learning object or net, as the strategies may specify the level of detail, type of materials to use, order of use of materials, or other aspects of accessing a learning object or net.

State maintenance module 650 maintains state (status) of a learning object or learning net as its preview is generated, maintaining information about where the user would be and where the user may go in simulating use of the object or net, for example. State maintenance module 650 may also maintain information about what has and has not been accessed, too. Error detection module 630 determines if parts of a learning object or net cannot be accessed, for example, based on the parts not being accessed by the preview generation module 610. User interface 660 is used to interface between a user and the preview generator module 610, for example, or between a surrounding user interface and the embodiment of medium 600.

Figure 7:
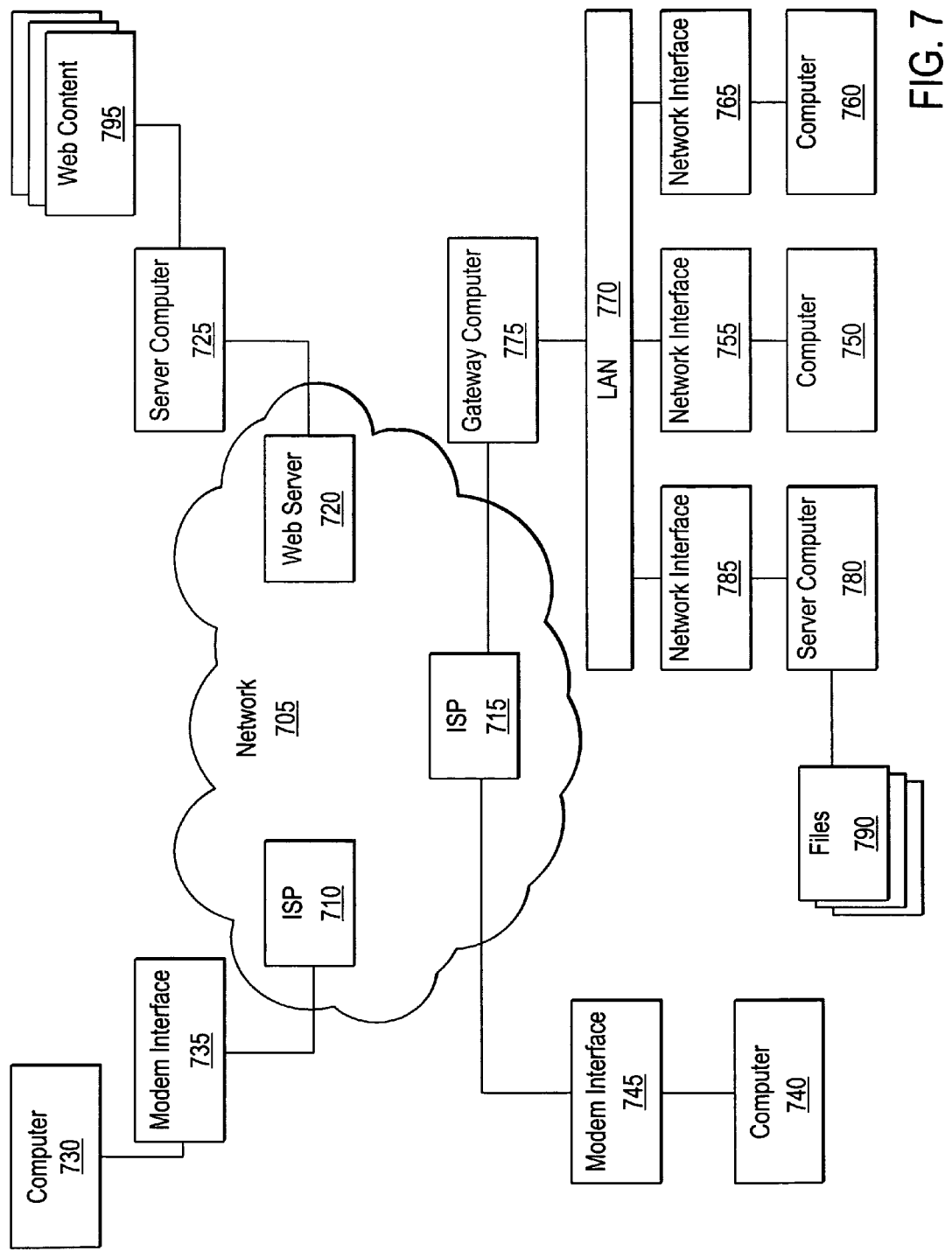
FIG. 7 illustrates an embodiment of a network which may be used in conjunction with a data object previewer.
Figure 8:
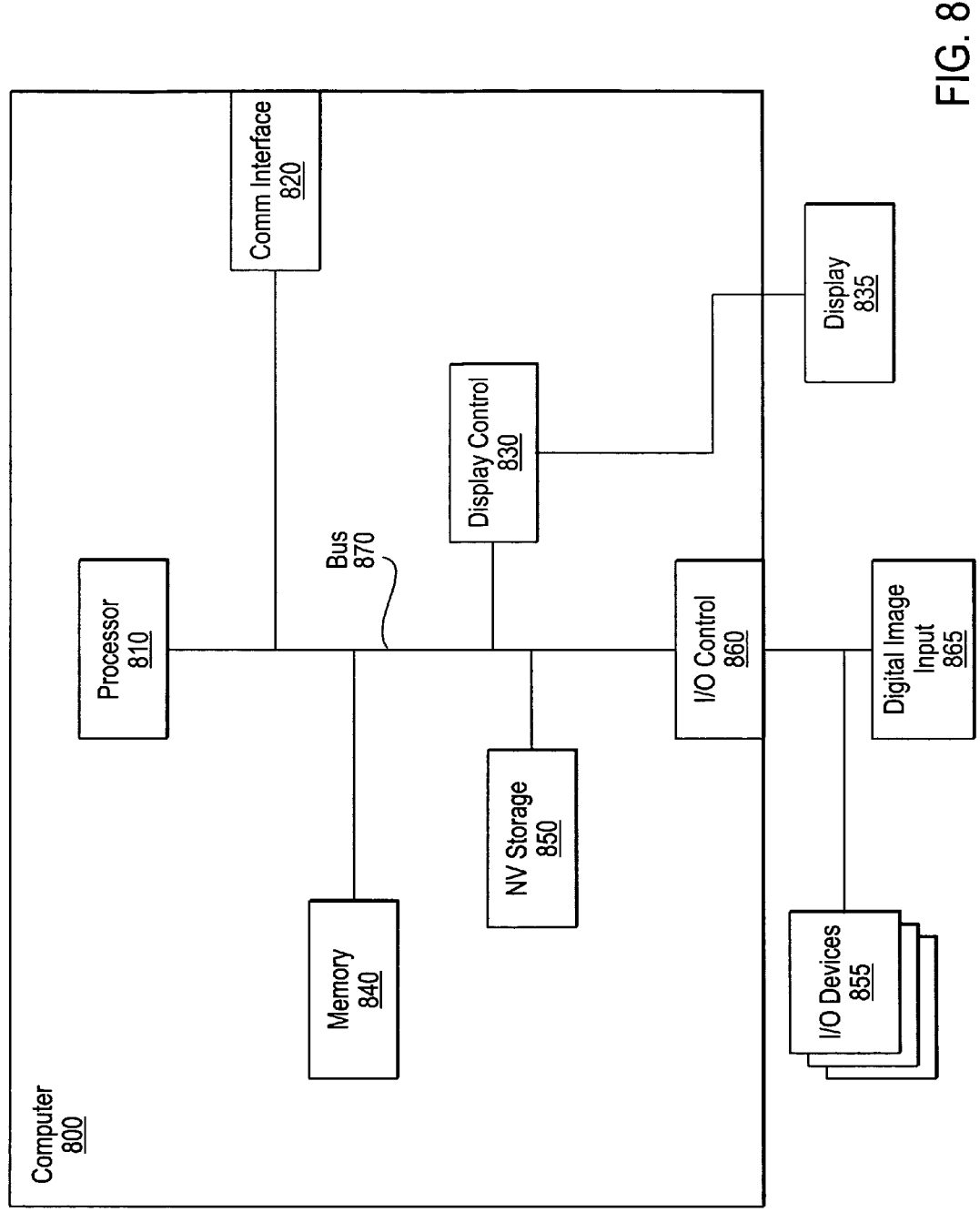
FIG. 8 illustrates an embodiment of a machine which may be used in conjunction with a data object previewer.

The following description of FIGS. 7-8 is intended to provide an overview of computer hardware and other operating components suitable for performing the methods of the invention described above and hereafter, but is not intended to limit the applicable environments. Similarly, the computer hardware and other operating components may be suitable as part of the apparatuses of the invention described above. The invention can be practiced with other computer system configurations, including hand-held devices, multiprocessor systems, microprocessor-based or programmable consumer electronics, network PCs, minicomputers, mainframe computers, and the like. The invention can also be practiced in distributed computing environments where tasks are performed by remote processing devices that are linked through a communications network.

FIG. 7 shows several computer systems that are coupled together through a network 705, such as the Internet. The term "Internet" as used herein refers to a network of networks which uses certain protocols, such as the TCP/IP protocol, and possibly other protocols such as the hypertext transfer protocol (HTTP) for hypertext markup language (HTML) documents that make up the World Wide Web (web). The physical connections of the Internet and the protocols and communication procedures of the Internet are well known to those of skill in the art.

Access to the Internet 705 is typically provided by Internet service providers (ISP), such as the ISPs 710 and 715. Users on client systems, such as client computer systems 730, 740, 750, and 760 obtain access to the Internet through the Internet service providers, such as ISPs 710 and 715. Access to the Internet allows users of the client computer systems to exchange information, receive and send e-mails, and view documents, such as documents which have been prepared in the HTML format. These documents are often provided by web servers, such as web server 720 which is considered to be "on" the Internet. Often these web servers are provided by the ISPs, such as ISP 710, although a computer system can be set up and connected to the Internet without that system also being an ISP.

The web server 720 is typically at least one computer system which operates as a server computer system and is configured to operate with the protocols of the World Wide Web and is coupled to the Internet. Optionally, the web server 720 can be part of an ISP which provides access to the Internet for client systems. The web server 720 is shown coupled to the server computer system 725 which itself is coupled to web content 795, which can be considered a form of a media database. While two computer systems 720 and 725 are shown in FIG. 7, the web server system 720 and the server computer system 725 can be one computer system having different software components providing the web server functionality and the server functionality provided by the server computer system 725 which will be described further below.

Client computer systems 730, 740, 750, and 760 can each, with the appropriate web browsing software, view HTML pages provided by the web server 720. The ISP 710 provides Internet connectivity to the client computer system 730 through the modem interface 735 which can be considered part of the client computer system 730. The client computer system can be a personal computer system, a network computer, a Web TV system, or other such computer system.

Similarly, the ISP 715 provides Internet connectivity for client systems 740, 750, and 760, although as shown in FIG. 7, the connections are not the same for these three computer systems. Client computer system 740 is coupled through a modem interface 745 while client computer systems 750 and 760 are part of a LAN. While FIG. 7 shows the interfaces 735 and 745 as generically as a "modem," each of these interfaces can be an analog modem, ISDN modem, cable modem, satellite transmission interface (e.g. "Direct PC"), or other interfaces for coupling a computer system to other computer systems.

Client computer systems 750 and 760 are coupled to a LAN 770 through network interfaces 755 and 765, which can be Ethernet network or other network interfaces. The LAN 770 is also coupled to a gateway computer system 775 which can provide firewall and other Internet related services for the local area network. This gateway computer system 775 is coupled to the ISP 715 to provide Internet connectivity to the client computer systems 750 and 760. The gateway computer system 775 can be a conventional server computer system. Also, the web server system 720 can be a conventional server computer system.

Alternatively, a server computer system 780 can be directly coupled to the LAN 770 through a network interface 785 to provide files 790 and other services to the clients 750, 760, without the need to connect to the Internet through the gateway system 775.

FIG. 8 shows one example of a conventional computer system that can be used as a client computer system or a server computer system or as a web server system. Such a computer system can be used to perform many of the functions of an Internet service provider, such as ISP 710. The computer system 800 interfaces to external systems through the modem or network interface 820. It will be appreciated that the modem or network interface 820 can be considered to be part of the computer system 800. This interface 820 can be an analog modem, ISDN modem, cable modem, token ring interface, satellite transmission interface (e.g. "Direct PC"), or other interfaces for coupling a computer system to other computer systems.

The computer system 800 includes a processor 810, which can be a conventional microprocessor such as an Intel Pentium microprocessor or Motorola Power PC microprocessor. Memory 840 is coupled to the processor 810 by a bus 870. Memory 840 can be dynamic random access memory (DRAM) and can also include static RAM (SRAM). The bus 870 couples the processor 810 to the memory 840, also to non-volatile storage 850, to display controller 830, and to the input/output (I/O) controller 860.

The display controller 830 controls in the conventional manner a display on a display device 835 which can be a cathode ray tube (CRT) or liquid crystal display (LCD). The input/output devices 855 can include a keyboard, disk drives, printers, a scanner, and other input and output devices, including a mouse or other pointing device. The display controller 830 and the I/O controller 860 can be implemented with conventional well known technology. A digital image input device 865 can be a digital camera which is coupled to an I/O controller 860 in order to allow images from the digital camera to be input into the computer system 800.

The non-volatile storage 850 is often a magnetic hard disk, an optical disk, or another form of storage for large amounts of data. Some of this data is often written, by a direct memory access process, into memory 840 during execution of software in the computer system 800. One of skill in the art will immediately recognize that the terms "machine-readable medium" or "computer-readable medium" includes any type of storage device that is accessible by the processor 810 and also encompasses a carrier wave that encodes a data signal.

The computer system 800 is one example of many possible computer systems which have different architectures. For example, personal computers based on an Intel microprocessor often have multiple buses, one of which can be an input/output (I/O) bus for the peripherals and one that directly connects the processor 810 and the memory 840 (often referred to as a memory bus). The buses are connected together through bridge components that perform any necessary translation due to differing bus protocols.

Network computers are another type of computer system that can be used with the present invention. Network computers do not usually include a hard disk or other mass storage, and the executable programs are loaded from a network connection into the memory 840 for execution by the processor 810. A Web TV system, which is known in the art, is also considered to be a computer system according to the present invention, but it may lack some of the features shown in FIG. 8, such as certain input or output devices. A typical computer system will usually include at least a processor, memory, and a bus coupling the memory to the processor.

In addition, the computer system 800 is controlled by operating system software which includes a file management system, such as a disk operating system, which is part of the operating system software. One example of an operating system software with its associated file management system software is the family of operating systems known as Windows® from Microsoft Corporation of Redmond, Wash., and their associated file management systems. Another example of an operating system software with its associated file management system software is the LINUX operating system and its associated file management system. The file management system is typically stored in the non-volatile storage 850 and causes the processor 810 to execute the various acts required by the operating system to input and output data and to store data in memory, including storing files on the non-volatile storage 850.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention, in some embodiments, also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language, and various embodiments may thus be implemented using a variety of programming languages.

EXAMPLE

A previewer may be implemented in a variety of ways, as appropriate for the objects and related parts of a structure to be previewed. One embodiment of such a previewer is illustrated by way of screenshots of an associated user interface in FIGS. 9-19.

Figure 9:
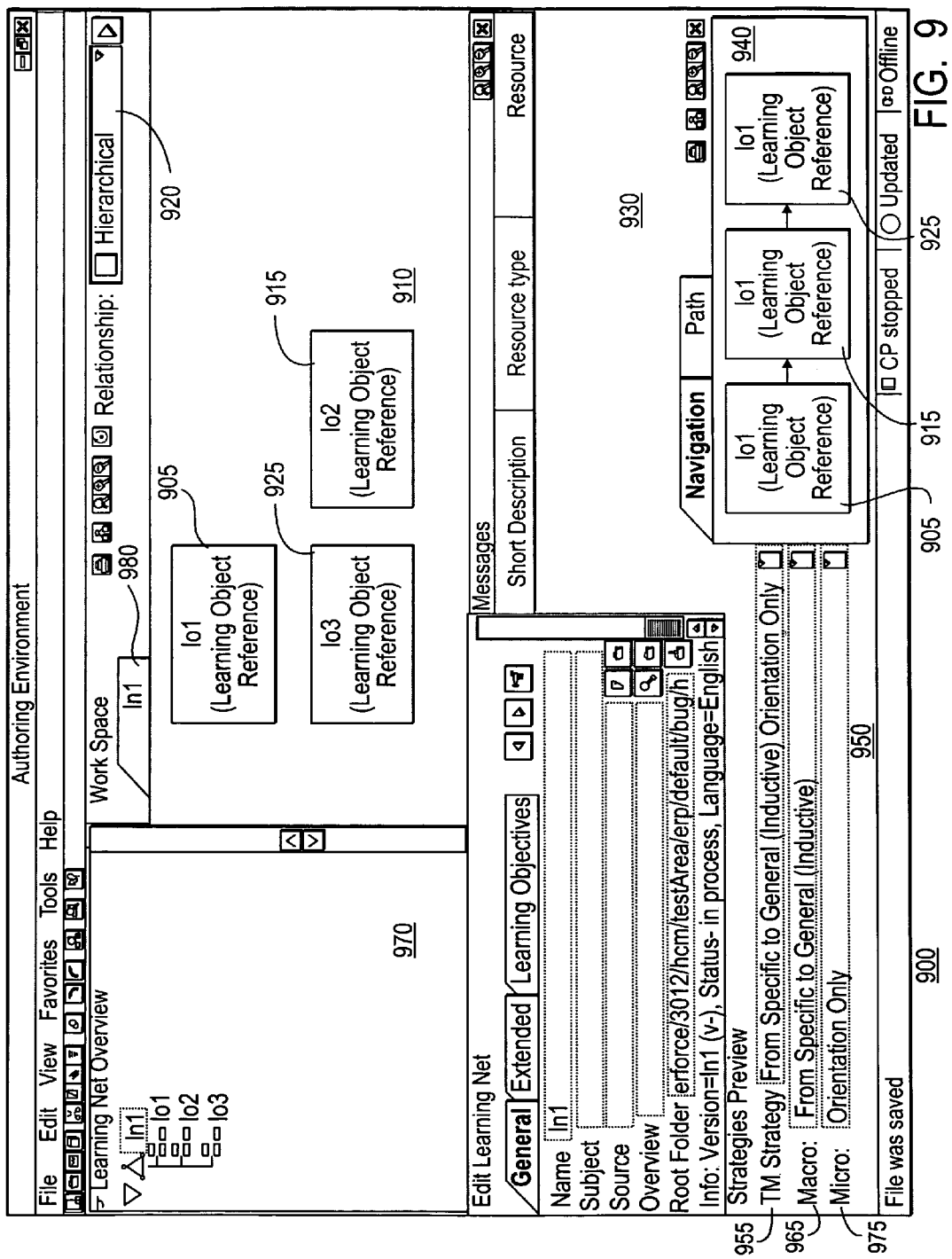
FIG. 9 illustrates an embodiment of a user interface of a previewer.

FIG. 9 illustrates an embodiment of a user interface of a previewer. User interface 900 is a graphical user interface which includes a workspace, a selection menu, a message window, a preview window, a strategy selection interface, and a hierarchical view window. Workspace 910 illustrates the various objects (of a learning net) or data items or elements (atomic learning materials of a learning object). What workspace 910 is displaying is indicated by guide 980, which provides the name or identifier for the displayed object (objects in this instance refer to both objects and nets). Thus, workspace 910 illustrates learning objects 905, 915 and 925. As illustrated, no relationships between the objects are present. Selection menu 920 may be used to create relationships, such as establishing prerequisites, alternatives, hierarchies and groupings, or other relationships. Moreover, a hierarchical view of the object displayed in the workspace 910 is provided in hierarchical view window 970.

Strategy selection interface 950 allows for selection of the strategy to be previewed in conjunction with the object in workspace 910. TM strategy selector 955 allows for selection of the training manager strategy in one embodiment, which may be an overall strategy used to govern the approach to the various objects. Macro strategy selector 965 may be used to select a macro strategy, which is used for learning nets in one embodiment. Similarly, micro strategy 975 may be used to select a micro strategy, which is used for learning objects in one embodiment. A strategy is used for an object (net, object, etc.) when it is used to determine how the contents of the object are used—it does not govern a relationship between the object and other objects, but between the subparts of the object. As illustrated, inductive strategies are selected for the TM strategy selector 955 and macro strategy selector 965, and an orientation only strategy is selected for the micro strategy selector 975. Typically, training manager strategies define a combination of a macro strategy and a micro strategy, such that selection of a training manager strategy effectively sets the selection of macro strategy selector 965 and micro strategy selector 975.

As a preview is generated, the preview is displayed in preview window 940 and related messages are displayed in message window 930. Preview window 940 provides a graphic representation of how the parts of the object of workspace 910 are to be presented or made available to a user. Note that the displayed preview is affected only by the TM strategy selector 955 and macro strategy selector 965, as this is a learning net on display. Message window 930 provides messages (such as error messages for example), none of which are present here. Note that preview window illustrates objects 905, 915 and 925. This can be an essentially identical representation, or a visual representation which appears similar but is otherwise provided only for visual purposes, for example.

Figure 10:
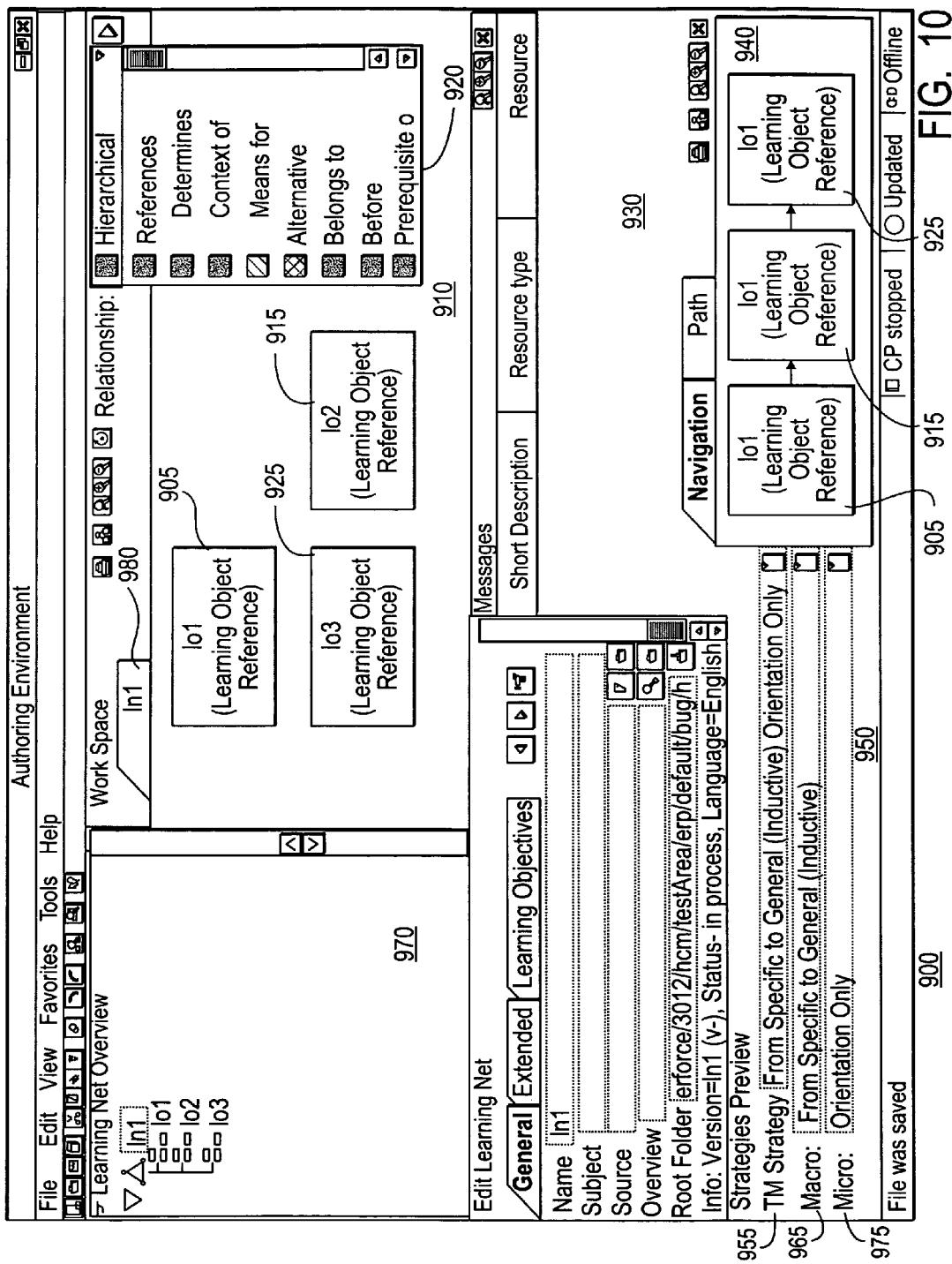
FIG. 10 further illustrates the user interface of FIG. 9.

FIGS. 10-19 further illustrates the user interface of FIG. 9, and are described with reference to changes and their effects. Referring to FIG. 10, the selection menu 920 is illustrated, indicating that various relationships may be implemented between the illustrated objects of workspace 910. These relationships include references (object refers to the other object), determines (object determines the other object), context of (object provides context of/for other object), means for (object provides means for other object), alternative (objects are alternatives), belongs to (object belongs to other object), before (object comes before other object), prerequisite (object must come before/be mastered before other object).

Figure 11:
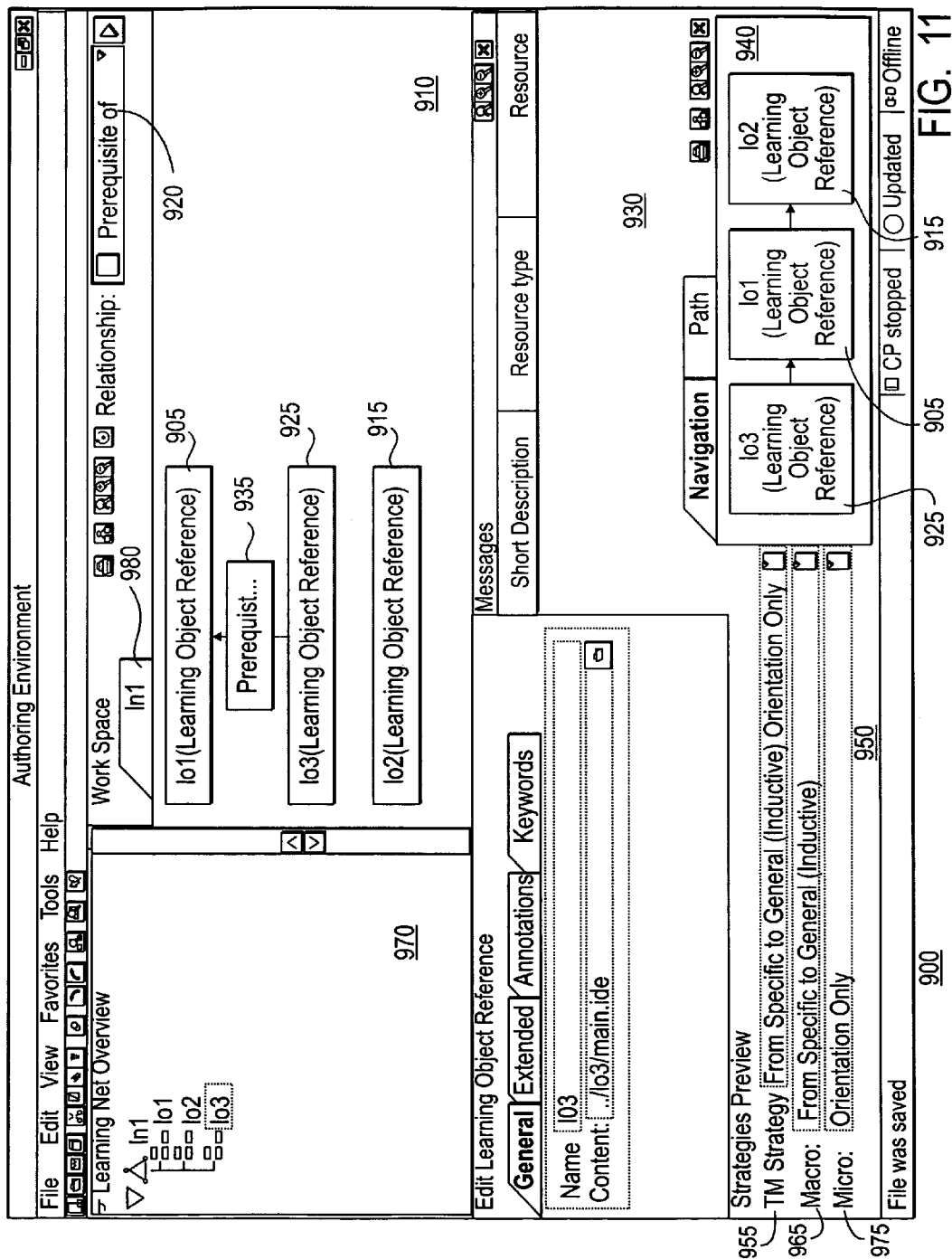
FIG. 11 further illustrates the user interface of FIG. 9.
Figure 12:
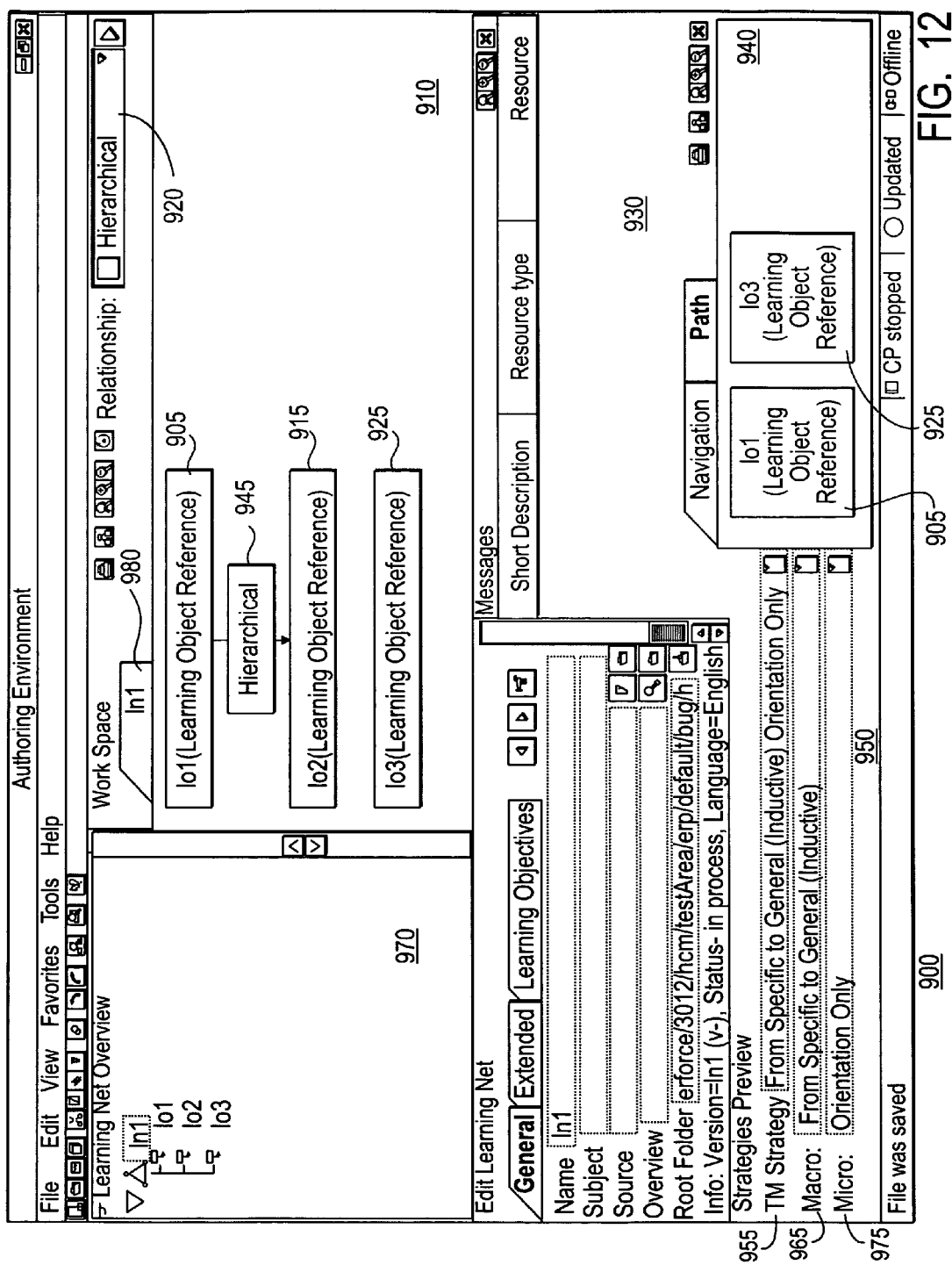
FIG. 12 further illustrates the user interface of FIG. 9.

Referring to FIG. 11, a relationship 935 between objects 925 and 905 (wherein 925 is a prerequisite to 905) is created/illustrated. This causes a change in preview window 940, where the prerequisite relationship now requires object 925 to be presented first. Similarly, in FIG. 12, relationship 945 is introduced between objects 905 and 915, such that object 915 is hierarchically part of object 905. As object 915 is now effectively a part of object 905, object 915 is no longer illustrated in preview window 940 for the orientation only strategy. Once object 905 is selected for previewing (instead of the learning net including object 905), object 915 would then be illustrated as part of object 905 in a resulting preview.

Figure 13:
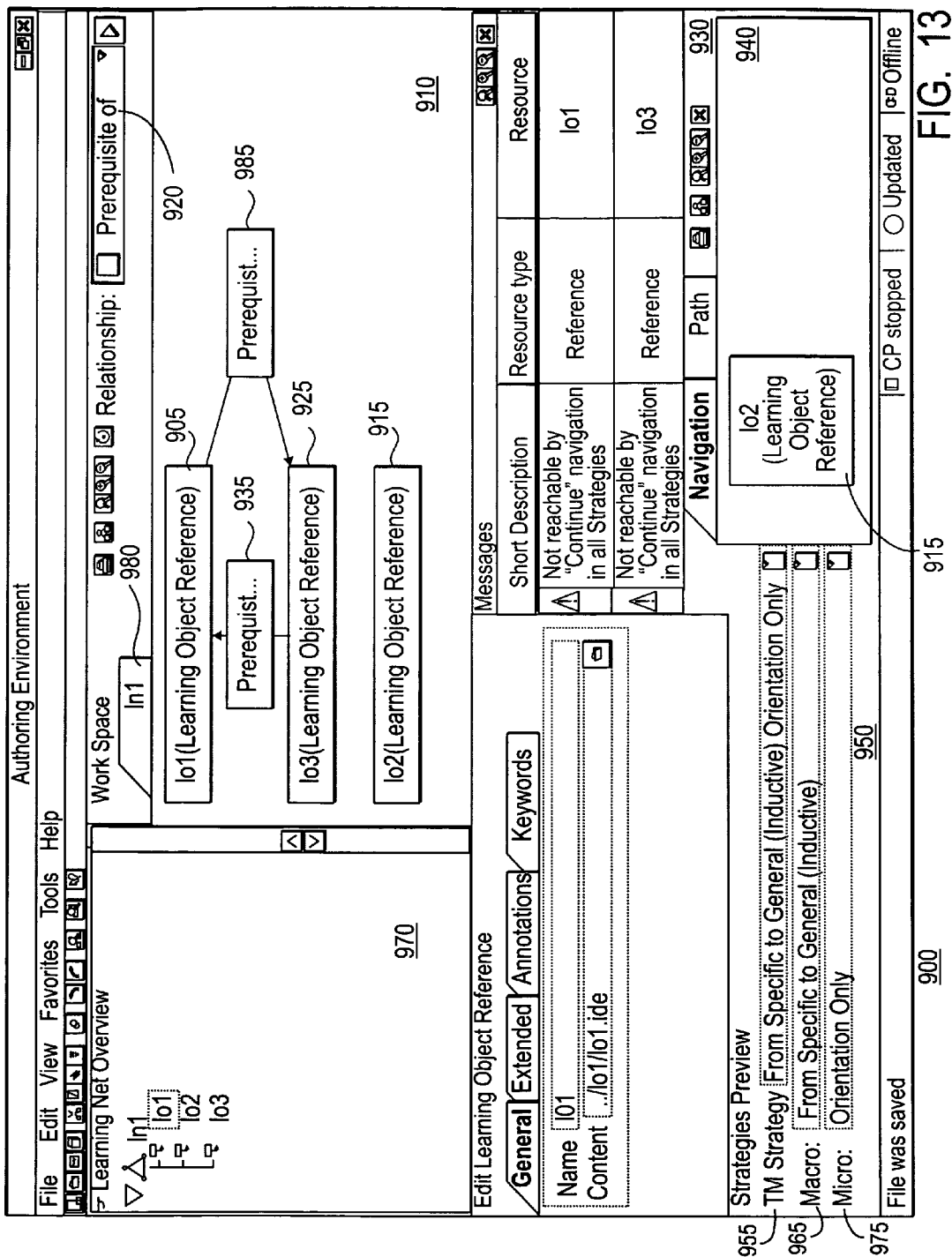
FIG. 13 further illustrates the user interface of FIG. 9.

Referring to FIG. 13, two relationships 935 and 985 are introduced. Relationship 935 is now a prerequisite relationship making object 915 a prerequisite of object 905. To further complicate things, relationship 985 makes object 905 a prerequisite of object 915. This creates a situation where neither of objects 905 and 915 may be reached, as each has an unfulfilled prerequisite. Accordingly, neither is illustrated in preview window 940, and messages indicating each is unreachable are generated in message window 930.

Figure 14:
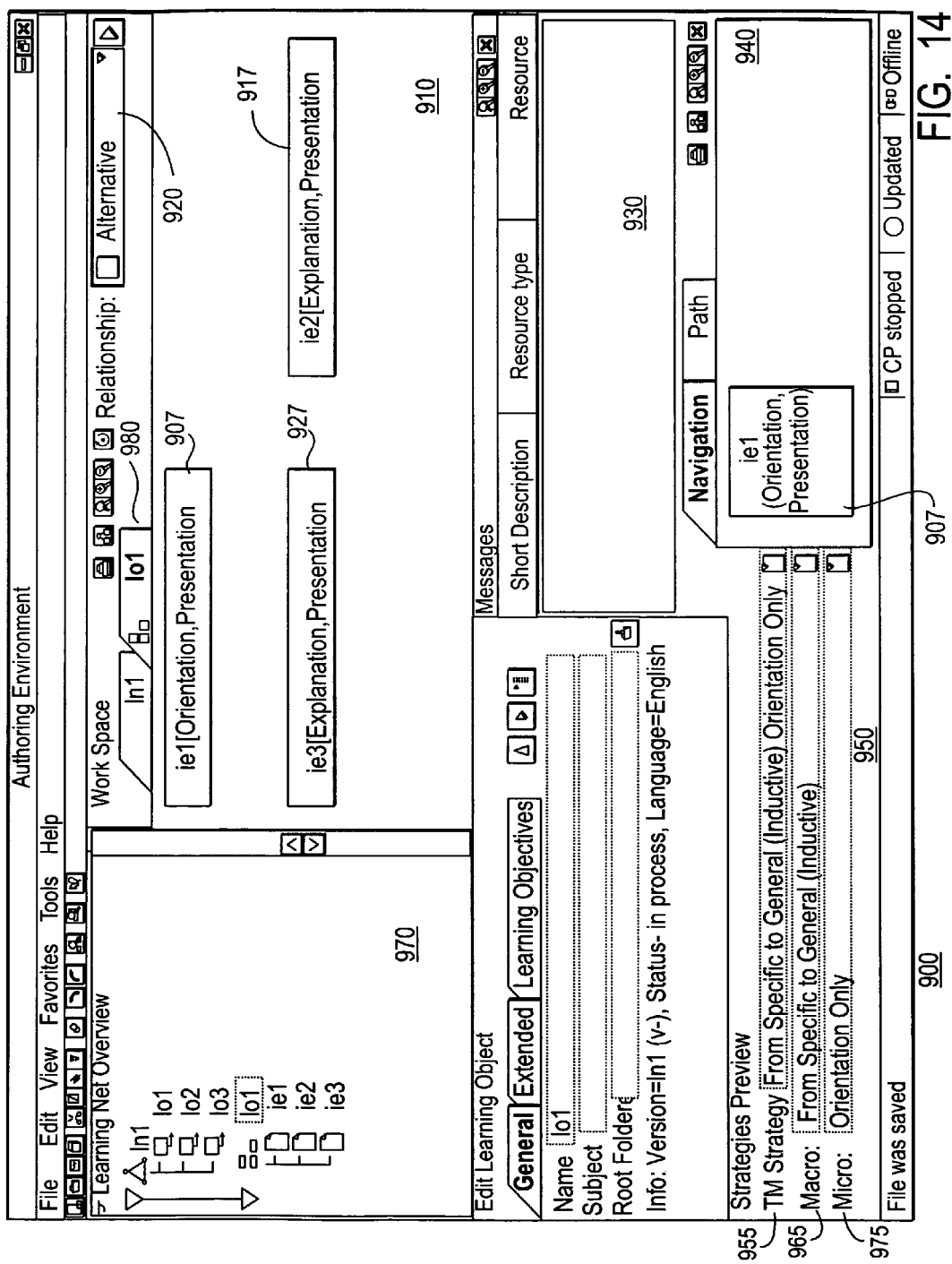
FIG. 14 further illustrates the user interface of FIG. 9.

Referring to FIG. 14, guide 980 indicates that the internals of learning object 905 (lo1) are being illustrated. This includes objects (atomic learning materials) 907, 917 and 927. Object 907 is an orientation object. Object 917 is an explanation object, and object 927 is an example object. Because an orientation-only strategy is in effect (micro strategy selector 975), only object 907 is displayed in preview window 940.

Figure 15:
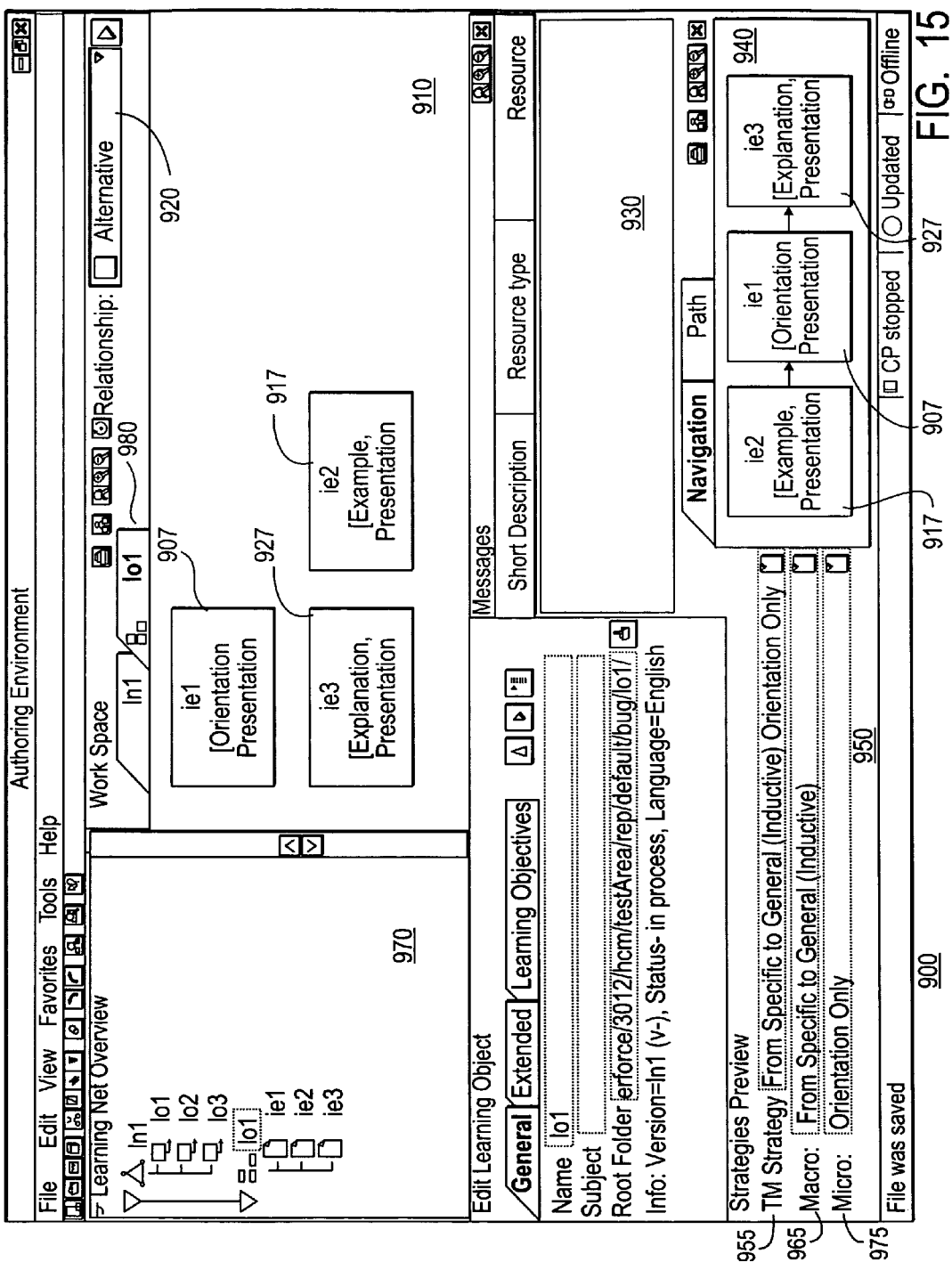
FIG. 15 further illustrates the user interface of FIG. 9.
Figure 16:
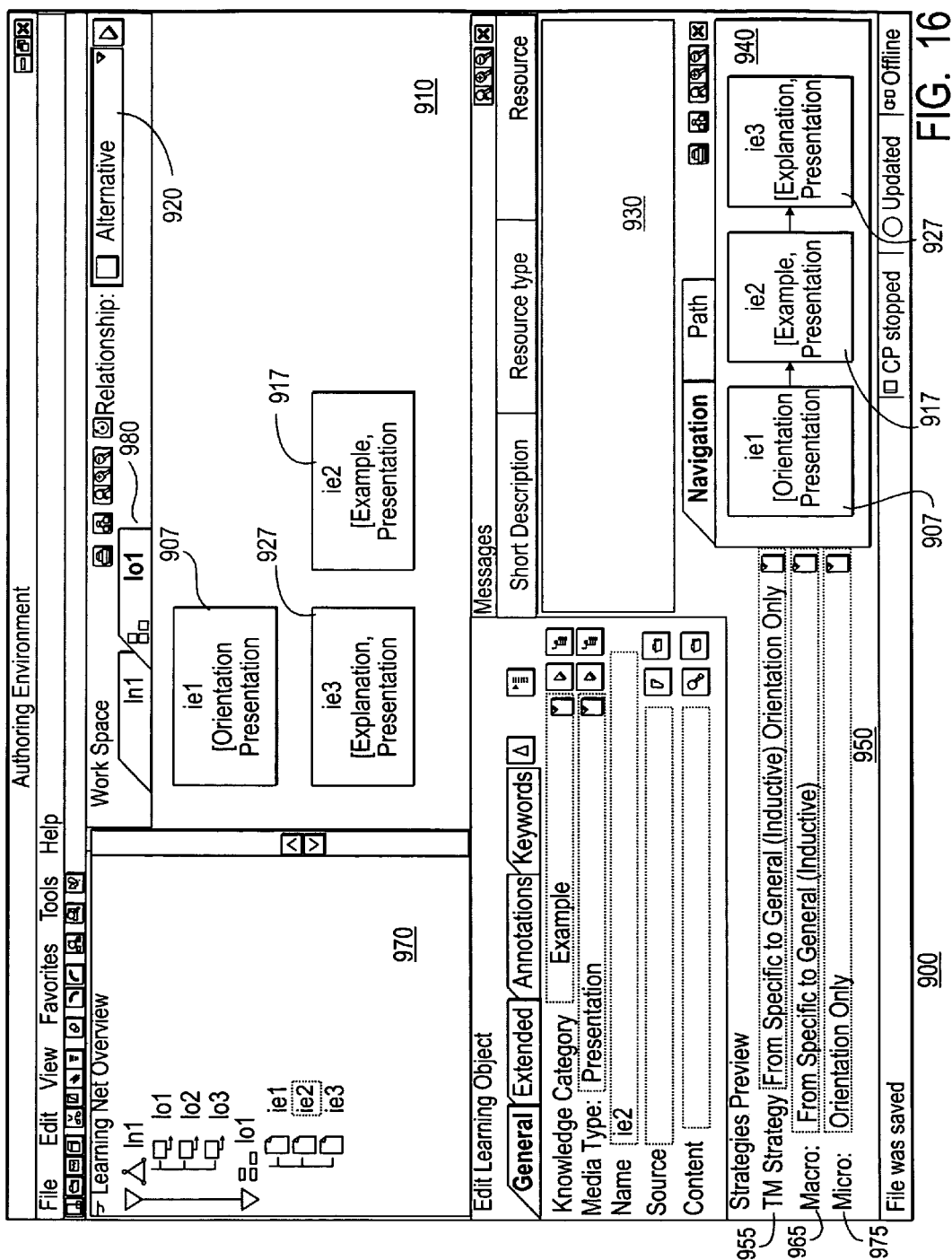
FIG. 16 further illustrates the user interface of FIG. 9.

In FIG. 15, an example-oriented strategy is selected in micro strategy selector 975, resulting in display of all three objects in preview window 940, with example object 917 ordered first. In some embodiments, where a strategy does not dictate an order, order of creation of the objects then takes over, causing object 907 to appear in the sequence before object 927. In FIG. 16, an orientation first strategy is selected in selector 975, resulting in object 907 appearing first in preview window 940. Note that object 917 is selected, and thus highlighted, in both workspace 910 and preview window 940, regardless of where the selection occurred.

Figure 17:
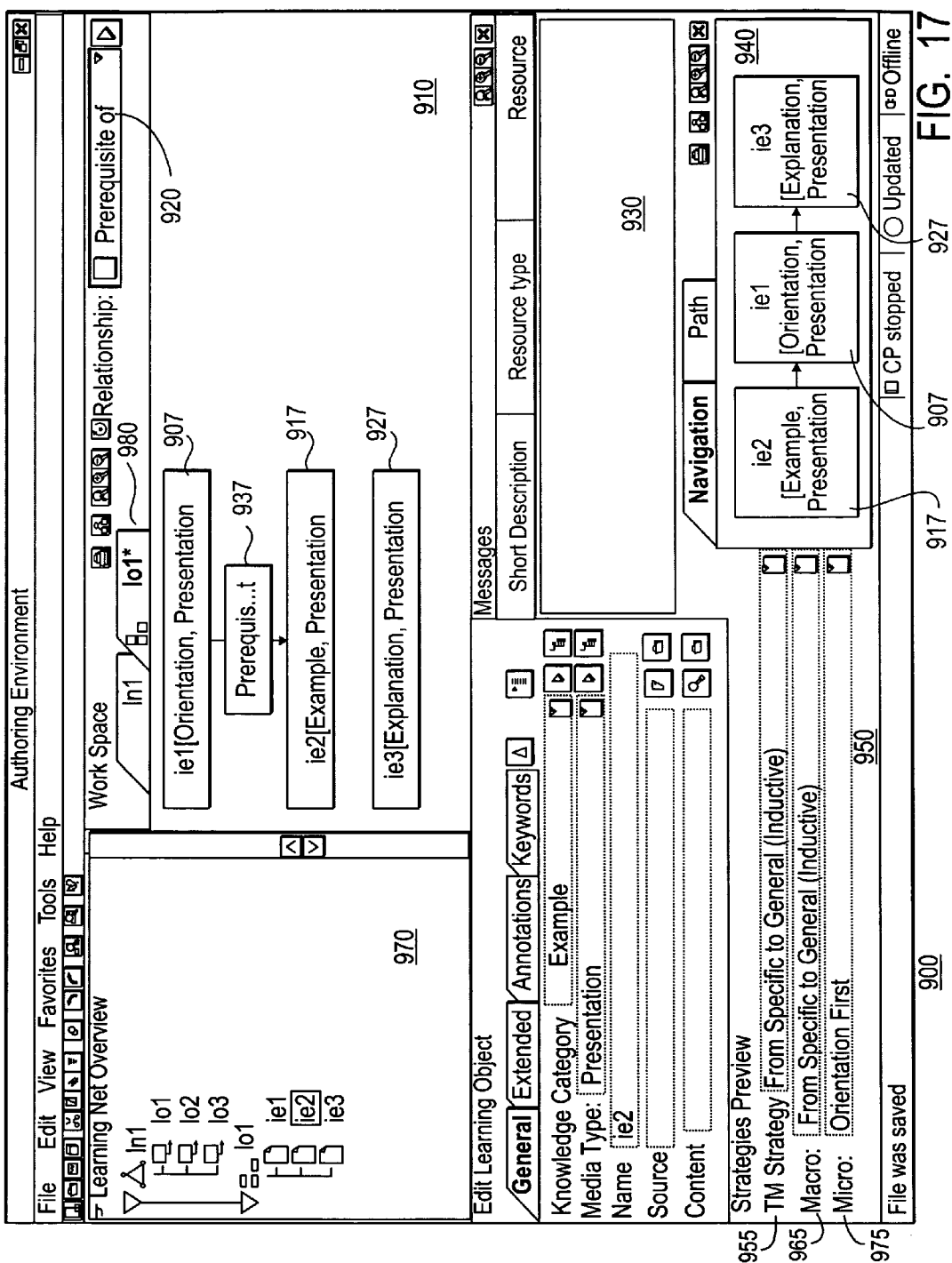
FIG. 17 further illustrates the user interface of FIG. 9.
Figure 18:
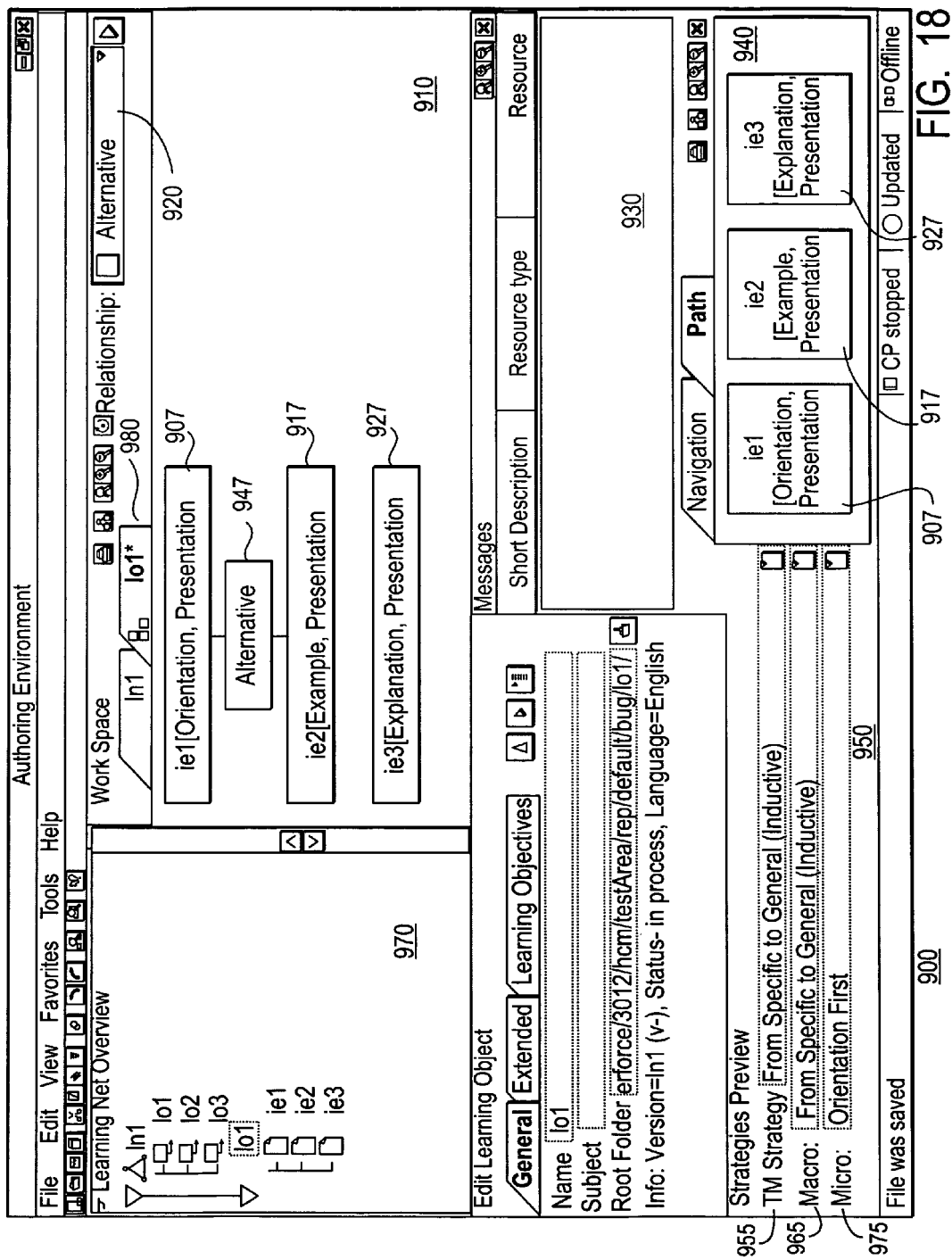
FIG. 18 further illustrates the user interface of FIG. 9.

Referring to FIG. 17, a prerequisite relationship 937 is created between object 907 and object 917, such that object 917 is now a prerequisite to object 907 and is presented before object 907, notwithstanding the orientation first strategy of selector 975. Turning to FIG. 18, an alternative relationship 947 is illustrated between objects 907 and 917. The alternative relationship 947 does not have an effect on the orientation first strategy of selector 975, and thus preview window 940 shows object 907 first. Note that the dependencies are not illustrated here (no arrows between objects 907, 917 and 927).

Figure 19:
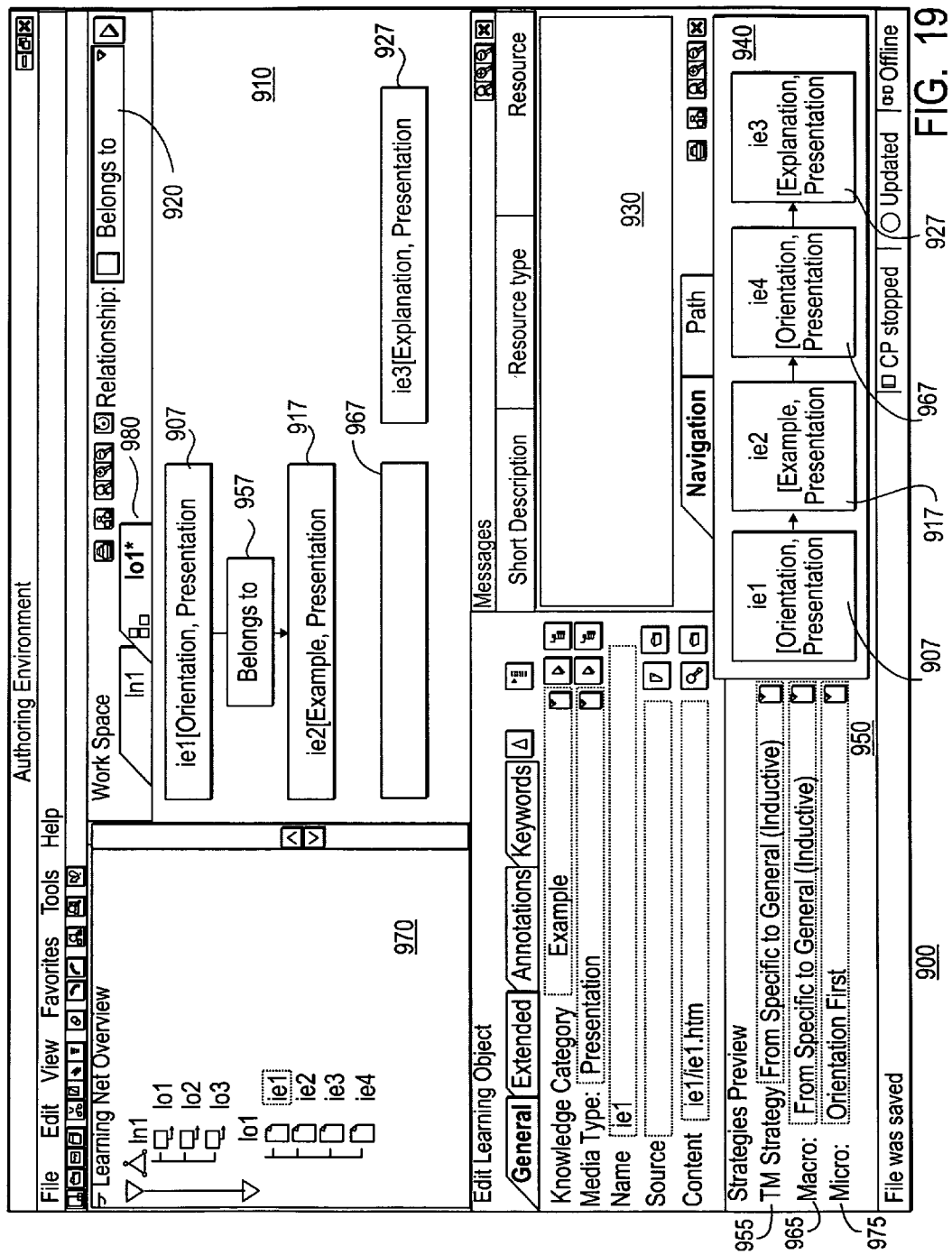
FIG. 19 further illustrates the user interface of FIG. 9.

Shifting to FIG. 19, an object 947 is created (or imported for example) in workspace 910 and a belongs to relationship 957 is created between objects 907 and 917. The orientation first strategy of selector 975 would normally cause an ordering of objects 907, 967 (orientations) then 917 and finally 927 in preview window 940. However, the relationship 957 causes object 917 to come with object 907, thus preceding object 967.

From the foregoing, it will be appreciated that specific embodiments of the invention have been described herein for purposes of illustration, but that various modifications may be made without deviating from the spirit and scope of the invention. In some instances, reference has been made to characteristics likely to be present in various or some embodiments, but these characteristics are also not necessarily limiting on the spirit and scope of the invention. In the illustrations and description, structures have been provided which may be formed or assembled in other ways within the spirit and scope of the invention. Moreover, in general, features from one embodiment may be used with other embodiments mentioned in this document provided the features are not somehow mutually exclusive.

In particular, the separate modules of the various block diagrams represent functional modules of methods or apparatuses and are not necessarily indicative of physical or logical separations or of an order of operation inherent in the spirit and scope of the present invention. Similarly, methods have been illustrated and described as linear processes, but such methods may have operations reordered or implemented in parallel within the spirit and scope of the invention. Accordingly, the invention is not limited except as by the appended claims.

What is claimed is:

1. A computer-implemented method comprising:
    detecting, by a processor, a change in how a structure is organized, which change is input via interaction with elements displayed in one or more first sections of a user interface;
    responsive to the detection of the change, positioning, by the processor, representations of software components of the structure into a preview, including:
        determining which of a plurality of structure strategies has been selected,
        creating an initial state model for an object of the structure in accordance with the strategy determined to have been selected,
        requesting a next available option for the object in relation to the strategy,
        updating the state model for the object,
        determining no options are available for the object in relation to the strategy,
        determining that something within the object was not reached based on the state model, and
        providing an indication of an error responsive to the determining that something was not reached; and
    presenting the preview, by the processor and in a display device, in a second section of the user interface separate from the one or more first sections.

2. The method of claim 1, wherein the structure is a set of learning nets, learning objects and associated strategies, the method further comprising:
    repeating the detecting, processing and presenting.

3. The method of claim 2, wherein processing the structure into a preview further includes repeating the requesting and updating responsive to not determining no options are available.

4. The method of claim 2, wherein:
the change is a change to a learning net.

5. The method of claim 2, wherein:
the change is a change to a learning object.

6. The method of claim 2, wherein:
the change is a change to the strategy selection.

7. The method of claim 2, wherein:
the change is a change to a strategy which is presently selected.

8. The method of claim 2, wherein:
the change is a change to a relationship between portions of the structure.

9. The method of claim 1, wherein the method further comprises:
repeating the detecting, processing and presenting.

10. A system, comprising:
a processor;
a bus coupled to the processor; and
a memory coupled to the bus;
wherein the processor is configured to:
  detect a change in a structure, which change is input via interaction with elements displayed in one or more first sections of a user interface;
  responsive to the detection of the change, position representations of software components of the structure into a preview, by:
    determining which of a plurality of structure strategies has been selected;
    creating an initial state model for an object of the structure in accordance with the strategy determined to have been selected;
    requesting a next available option for the object in relation to the strategy; and
    updating the state model for the object; and
  present the preview in a second section of the user interface separate from the one or more first sections.

11. The system of claim 10, wherein in processing the structure into the preview, the processor is to:
determine no options are available for the object in relation to the strategy,
determine that something within the object was not reached based on the state model, and
provide an indication of an error responsive to the determining that something was not reached.

12. The system of claim 10, wherein in presenting the preview, the processor is to:
present a visual representation of the structure in light of the selected strategy.

13. A hardware computer-readable medium having stored thereon instructions, which, when executed by a processor, cause the processor to perform a method, the method comprising:
detecting a change in how a structure formed of a set of objects including learning nets, learning objects, and an associated selected strategy is organized, which change is input via interaction with elements displayed in one or more first sections of a user interface; and
responsive to the detection of the change:
  positioning representations of software components of the structure into a preview, including:
    determining which strategy has been selected;
    creating an initial state model for an object of the structure in accordance with the strategy determined to have been selected;
    requesting a next available option for the object in relation to the strategy determined to have been selected;
    determining that something within the object was not reached based on the state model; and
    providing an indication of an error responsive to the determining that something was not reached; and
  presenting the preview in a second section of the user interface separate from the one or more first sections.

14. A method of an object-development machine comprising:
providing, by the machine, an object developer user interface window that includes:
  a first section displaying representations of software components of an object, wherein an interaction with the first section results in a change to relationships between the software components of the object;
  a second section; and
  a third section;
detecting, by the machine, the change; and
responsive to the detection of the change:
  generating, by the machine, a map representing a sequence in which the software components are to be provided for access by a user; and
  displaying, by the machine, the generated map in the second section;
wherein:
  a plurality of preset component output strategies are stored, each of the component output strategies including a respective set of rules;
  for each of the component output strategies, a reference to the respective component output strategy is inputtable via interaction with the third section for selection of the respective component output strategy; and
  the machine applies the stored set of rules of the component output strategy selected via the third section for the generation of the map.

15. The method of claim 14, further comprising:
responsive to the detection of the change, determining, by the machine, whether the relationships render any of the software components of the object inaccessible; and
responsive to a determination that one or more of the software components are inaccessible, outputting an error message indicating component inaccessibility.

16. The method of claim 15, wherein the error message is output in a fourth section of the window.

17. The method of claim 15, wherein the first and second sections are simultaneously displayed.

18. The method of claim 15, wherein the relationships that are changed include at least one of a setting of one of the software components as a prerequisite to another of the software components and a setting of one of the software components as an alternative to another of the software components.

19. The method of claim 15, wherein a first software component is determined to be inaccessible where a first relationship created via the first section sets the first software component as a prerequisite to a second software component and a second relationship created via the first section sets the second software component as a prerequisite to the first software component.

20. The method of claim 14, wherein the component output strategy is selectable from a plurality of strategies including at least one of a strategy that dictates a type of materials to use for an object to which it is applied and a strategy that dictates an order of use of materials used for an object to which it is applied.

21. The method of claim 20, wherein the plurality of strategies includes an inductive strategy, a deductive strategy, an orientation-first strategy, and an example-first strategy.

22. The method of claim 14, wherein the first section includes a drop-down menu from which predefined relationships are selectable for application to software components of the object.

23. The method of claim 14, wherein the object is one of a plurality of objects selectable from a third section of the window, and the map displayed in the second section is selectively of the representations of the software components of the selected object, representations of software components of the non-selected object not being mapped in the second section.

24. The method of claim 23, wherein:
responsive to a change to the relationships which includes creating a new hierarchical relationship between a first software component and a second software component, the representation of the first software component is removed from the map; and
subsequent to the removal of the representation of the first software component from the map, responsive to a subsequent selection of the second software component in the third section, the representation of the first software component is provided in the map.

25. The method of claim 14, wherein:
a component output strategy that is in conflict with a relationship set in the first section is selectable; and
where the conflict exists, the generation of the map is in accordance with the relationship.

* * * * *